(12) United States Patent
Yamana

(10) Patent No.: US 9,335,611 B2
(45) Date of Patent: May 10, 2016

(54) IMAGING APPARATUS

(75) Inventor: Kazuaki Yamana, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 905 days.

(21) Appl. No.: 13/559,024

(22) Filed: Jul. 26, 2012

(65) Prior Publication Data

US 2013/0027797 A1 Jan. 31, 2013

(30) Foreign Application Priority Data

Jul. 29, 2011 (JP) ................................. 2011-166965

(51) Int. Cl.
 *G02B 7/198* (2006.01)
 *G03B 19/12* (2006.01)
 *G02B 7/182* (2006.01)

(52) U.S. Cl.
 CPC .............. *G03B 19/12* (2013.01); *G02B 7/1821* (2013.01); *G02B 7/198* (2013.01)

(58) Field of Classification Search
 CPC ....... G02B 7/1821; G02B 7/198; C03B 19/12
 USPC ............................ 359/877; 396/352, 358, 447
 See application file for complete search history.

(56) References Cited

U.S. PATENT DOCUMENTS

| 4,348,088 | A | * | 9/1982 | Yamamichi | ............ | G03B 19/12 |
|           |   |   |        |           |             | 396/268 |
| 4,673,278 | A | * | 6/1987 | Fukuda | ................. | G03B 19/12 |
|           |   |   |        |           |             | 396/272 |
| 4,843,420 | A | * | 6/1989 | Fukuda | ................. | G03B 19/12 |
|           |   |   |        |           |             | 396/272 |
| 8,500,343 | B2 | * | 8/2013 | Niwamae | ................. | G03B 9/42 |
|           |   |   |        |           |             | 396/357 |
| 8,529,141 | B2 | * | 9/2013 | Watanabe | ............. | G03B 17/17 |
|           |   |   |        |           |             | 396/354 |
| 8,734,030 | B2 | * | 5/2014 | Yamana | ................. | G03B 19/12 |
|           |   |   |        |           |             | 396/352 |
| 9,039,305 | B2 | * | 5/2015 | Yamana | ................. | G03B 19/12 |
|           |   |   |        |           |             | 396/358 |
| 9,063,395 | B2 | * | 6/2015 | Yamana | ................. | G03B 19/12 |
|           |   |   |        |           |             | 396/358 |
| 2005/0276598 | A1 | | 12/2005 | Tomatsu | | |
| 2009/0097839 | A1 | | 4/2009 | Iwase | | |
| 2009/0284819 | A1 | * | 11/2009 | Yamaguchi | ............ | G02B 7/182 |
|           |   |   |        |           |             | 359/221.2 |
| 2011/0052177 | A1 | * | 3/2011 | Yamana | ................. | G03B 19/12 |
|           |   |   |        |           |             | 396/358 |

FOREIGN PATENT DOCUMENTS

| CN | 001707345 A | 12/2005 |
| CN | 101414106 A | 4/2009 |
| CN | 101581820 A | 11/2009 |
| JP | 10-096998 A | 4/1998 |
| JP | 2008-175920 A | 7/2008 |

* cited by examiner

*Primary Examiner* — Ricky D Shafer
(74) *Attorney, Agent, or Firm* — Canon USA, Inc. IP Division

(57) ABSTRACT

When a mirror charge lever is driven to a mirror-up position, the mirror charge lever is engaged with a first cam portion and driven to the mirror-up position in a region in which a force of a mirror-up spring for urging the mirror charge lever to the mirror-up position is larger than a force of a mirror-down spring for urging the mirror charge lever to the mirror-down position. In a region in which the force of the mirror-down spring for urging the mirror charge lever to the mirror-down position is equal to or larger than the force of the mirror-up spring for urging the mirror charge lever to the mirror-up position, the mirror charge lever is engaged with the second cam portion and driven to the mirror-up position.

5 Claims, 7 Drawing Sheets

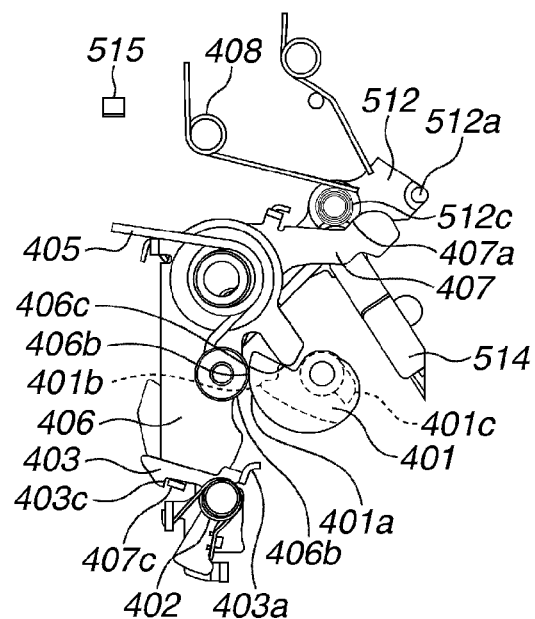
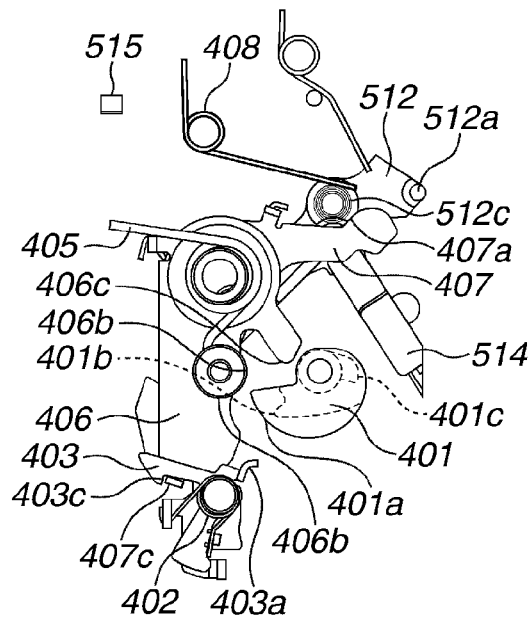
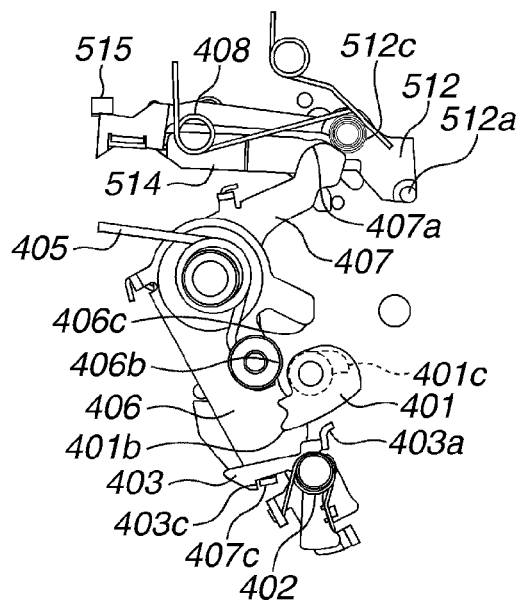

IMAGING APPARATUS

BACKGROUND OF THE INVENTION

1. Field of the Invention

The present invention relates to an imaging apparatus including a mirror insertable into and retractable from an optical path.

2. Description of the Related Art

A conventional imaging apparatus is known to insert a mirror into and retract it from an optical path at two different speeds (Japanese Patent Application Laid-Open No. 2008-175920).

Japanese Patent Application Laid-Open No. 2008-175920 discusses a technique for inserting the mirror into and retracting it from the optical path at two different speeds based on the following configuration. When a control unit operates a motor in a first direction, a first cam portion formed on a cam member releases engagement between a mirror drive member and a charging member. When the engagement between the mirror drive member and the charging member is released, the mirror drive member moves the mirror at a first speed from a mirror-up position to a mirror-down position by an urging force of an urging member.

When the control unit moves the motor in a second direction opposite to the first direction, a second cam portion formed on the cam member contacts the charging member engaged with the mirror drive member, and the mirror drive member and the charging member are driven by the motor. Thus, the mirror is driven at a second speed from the mirror-up position to the mirror-down position.

SUMMARY OF THE INVENTION

According to an aspect of the present invention, an imaging apparatus includes a mirror member which is movable between a first position disposed on an optical axis of an imaging optical system and a second position retracted from the optical axis, a first urging member configured to urge the mirror member toward the first position, a second urging member configured to urge the mirror member toward the second position, and a drive member configured to be driven by a driving source to drive the mirror member to the second position, wherein, a first engaging portion and a second engaging portion to be engaged with the mirror member are formed on the drive member, wherein, if the mirror member is driven to the second position, the mirror member is engaged with the first engaging portion and driven to the second position in a region in which a force of the second urging member for urging the mirror member toward the second position is larger than a force of the first urging member for urging the mirror member toward the first position, and wherein, the mirror member is engaged with the second engaging portion and driven to the second position in a region in which the force of the first urging member for urging the mirror member toward the first position is equal to or larger than the force of the second urging member for urging the mirror member toward the second position.

According to the present invention, even with a small inertia force acting on a mirror, the mirror can be driven to the mirror-up position in a region where a spring force of a mirror-down spring is larger than a spring force of a mirror-up spring.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A to 4C illustrate a mirror-up operation of the quick return mirror unit in a high-speed mode.

DESCRIPTION OF THE EMBODIMENTS

Various exemplary embodiments, features, and aspects of the invention will be described in detail below with reference to the drawings.

Figure 1:
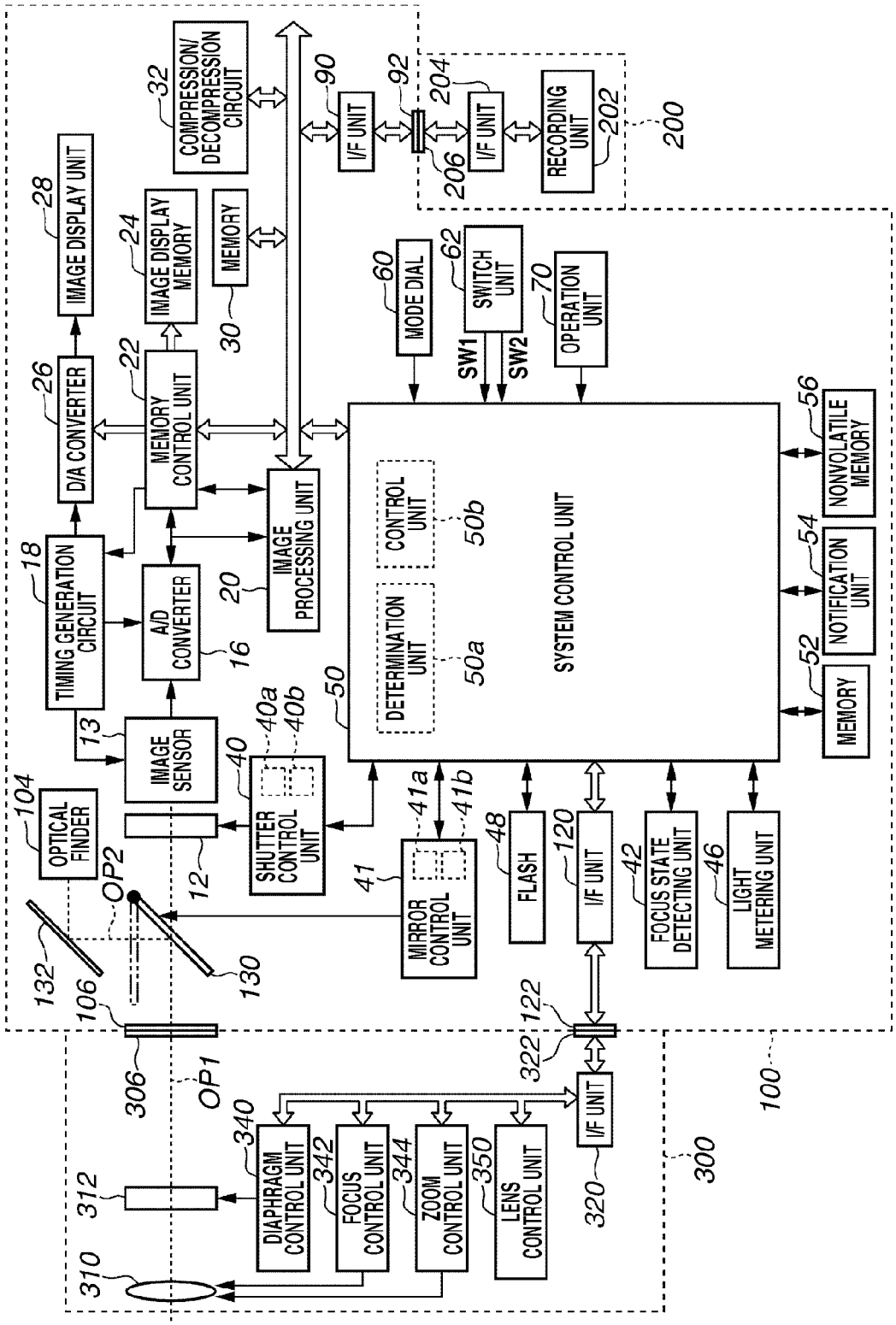
FIG. 1 is a block diagram illustrating a configuration of an imaging apparatus according to an exemplary embodiment of the present invention.

FIG. 1 is a block diagram illustrating an example configuration of an imaging apparatus. The imaging apparatus includes a lens unit 300 and a camera body 100.

The lens unit 300 is an interchangeable lens. A lens mount 306 mechanically and electrically connects the lens unit 300 and the camera body 100. A lens 310 constituting an imaging optical system includes a focus lens and a zoom lens (not illustrated) which are movable along an optical axis thereof (see an optical path OP1 drawn with a broken line). A diaphragm 312 is disposed on the optical axis OP1 to adjust a light quantity. An interface (I/F) unit 320 is connected with an I/F unit 120 in the camera body 100.

Connectors 322 and 122 electrically connect the lens unit 300 and the camera body 100, enable exchanging control signals, status signals, data signals, and the like therebetween, and supply various voltages from the camera body 100 to the lens unit 300. A diaphragm control unit 340 controls the diaphragm 312 in collaboration with a shutter control unit 40 based on light metering information from a light metering unit 46 (described below). A focus control unit 342 drives the focus lens to control focus adjustment. A zoom control unit 344 drives the zoom lens to control a zooming operation. A lens control unit 350 is connected with the I/F unit 320 and each control unit to control the entire lens unit 300.

A configuration of the camera body 100 will be described below.

A shutter 12 controls an exposure of an image sensor 13. Light entering the lens 310 while the shutter 12 is in an open state passes through the diaphragm 312, the lens mounts 306 and 106, and the shutter 12, and reaches the image sensor 13. An object image is formed on an imaging plane (a pixel array). At this timing, a mirror 130 is in a mirror-up state in which the mirror 130 is retracted from the optical path OP1, as drawn by two-dot chain lines. The mirror 130 is a movable mirror member and disposed on an object side of the image sensor 13. Hereinbelow, a first position in a mirror-down state in which the mirror 130 is disposed on the optical axis of the imaging optical system is referred to as a "mirror-down position." A second position in a mirror-up state in which the mirror 130 is retracted from the optical axis is referred to as a "mirror-up position." A drive mechanism of the mirror 130 will be described in detail below.

The image sensor 13 applies photoelectric conversion to an object image to generate an image signal. An analog-to-digital (A/D) converter 16 converts an output signal of the image sensor 13 into a digital signal to acquire image data. A timing generation circuit 18 is controlled by a memory control unit 22 and a system control unit 50 to supply a clock signal and a control signal to the image sensor 13, the A/D converter 16, and a digital-to-analog (D/A) converter 26. An image processing unit 20 applies predetermined pixel interpolation processing and color conversion processing to the image data output from the A/D converter 16 and to the image data output from the memory control unit 22.

The memory control unit 22 controls the A/D converter 16, the timing generation circuit 18, the image processing unit 20, an image display memory 24, the D/A converter 26, a memory 30, and a compression/decompression circuit 32. The image data output by the A/D converter 16 is stored in the image display memory 24 or the memory 30 via the image processing unit 20 or via the image processing unit 20 and the memory control unit 22. The image display memory 24 temporarily stores image data to be displayed on an image display unit 28. The D/A converter 26 accesses the image display memory 24 via the memory control unit 22 to acquire image data, converts the image data into an image signal (analog signal) for display, and outputs the resultant image signal to the image display unit 28.

The image display unit 28 is a liquid crystal display (LCD) unit, such as a thin-film transistor (TFT)-LCD unit. The memory 30 temporarily stores captured still image data and also serves as a work area for the system control unit 50. The compression/decompression circuit 32 reads the image data stored in the memory 30, applies compression or decompression processing to the image data, and stores the processed image data back in the memory 30.

Based on the result of light metering by the light metering unit 46, the shutter control unit 40 controls the shutter 12 in collaboration with the diaphragm control unit 340 which controls the diaphragm 312. The shutter control unit 40 includes a shutter drive unit 40a and a shutter drive motor 40b. The shutter drive unit 40a drives the shutter 12 to expose the image sensor 13 to the light. The shutter drive motor 40b includes a charge function for the shutter 12, and operates to switch between a fixed state in which the shutter drive unit 40a is fixed and a released state in which the shutter drive unit 40a is released from the fixed state.

The mirror control unit 41 moves the mirror 130 to the mirror-up position (see the two-dot chain lines) or the mirror-down position (see the solid lines) via a driving unit 41a of a mirror drive mechanism. The mirror control unit 41 controls a mirror drive motor (hereinafter referred to simply as drive motor) 41b as an actuator (i.e., a driving source). Drive control for the mirror 130 will be described in detail below.

The focus state detecting unit 42 detects a focus state of the imaging optical system. Light entering the lens 310 passes through the diaphragm 312, the lens mounts 306 and 106, the mirror 130, and a sub mirror (described below), and is detected by a light receiving unit of the focus state detecting unit 42. The focus state detecting unit 42 outputs the detection result of an in-focus state to the system control unit 50. The light metering unit 46 detects the light which enters the lens 310 and passes through the diaphragm 312, the lens mounts 306 and 106, the mirrors 130 and 132, and a light metering lens (not illustrated). The light metering unit 46 outputs the detection result of an exposure state to the system control unit 50. The light metering unit 46 further performs the flash pre-emission (EF) processing in collaboration with a flash 48.

The flash 48 has an automatic focus (AF) auxiliary light projecting function and a flash light amount control function, and emits light at a predetermined timing in response to an instruction from the system control unit 50. The mirror 132 reflects a light beam reflected by the mirror 130, and guides it to an optical finder 104. An optical path OP2 is a branch of the optical path OP1 toward the image sensor 13 and is formed by the mirror 130 disposed at the mirror-down position.

The system control unit 50 which controls the entire camera body 100 includes a determination unit 50a and a control unit 50b. The determination unit 50a determines a set image capturing mode and determines whether the lens unit 300 is attached to the main unit 100. The control unit 50b outputs a control command to the mirror control unit 41 based on the result of determination by the determination unit 50a. The determination unit 50a and the control unit 50b perform processing according to a program which is interpreted and executed by a central processing unit (CPU) constituting the system control unit 50. The determination unit 50a and the control unit 50b will be described in detail below.

A memory 52 stores constants, variables, programs, and the like for operations of the system control unit 50. The notification unit 54 indicates to a user a text or an image message on a display device, or a voice message via a speaker according to program execution by the system control unit 50. The notification unit 54 is disposed at a position where it is easily recognized by the camera body 100. A part of the notification unit 54 is provided also in the optical finder 104. A nonvolatile memory 56 is an electrically erasable and recordable memory such as an erasable programmable read-only memory (EEPROM).

Various operation instructions to the system control unit 50 will be described below. FIG. 1 illustrates a mode dial 60, a switch unit 62, and an operation unit 70. The mode dial 60 outputs to the system control unit 50 a user operation instruction for the image capturing mode including a low-speed continuous image capturing mode, a high-speed continuous image capturing mode, and the like. The switch unit 62 can receive two different instructions in response to a user operation. When the user presses a shutter release button (not illustrated), a first switch SW1 is turned ON in a first step (for example, when the user half-presses the button). In response to this instruction, an instruction to start AF, automatic exposure (AE), or EF processing is issued to the system control unit 50. A second switch SW2 is turned ON in a second step (for example, when the user full-presses the button). In response to this instruction, an instruction to start imaging processing including exposure processing, development processing, and recording processing is issued to the system control unit 50.

The exposure processing refers to storing in the memory 30 an image signal from the image sensor 13 as image data via the A/D converter 16 and the memory control unit 22. The development processing refers to calculation processing in the image processing unit 20 and the memory control unit 22. The recording processing refers to reading the image data from the memory 30, compressing the image data via the compression/decompression circuit 32, and storing the image data in a recording medium 200. The recording medium 200 such as a memory card and a hard disk is provided with a recording unit 202, an I/F unit 204, and a connector 206. The connector 206 is connected to an I/F unit 90 via the connector 92 of the camera body 100.

The operation unit 70 includes various operation members such as a menu button, setting buttons, and changeover buttons, and outputs an operation instruction signal to the system control unit 50.

The configuration of the mirror control unit 41 will be described in detail below with reference to FIGS. 2 and 3A to 3C.

Figure 2:
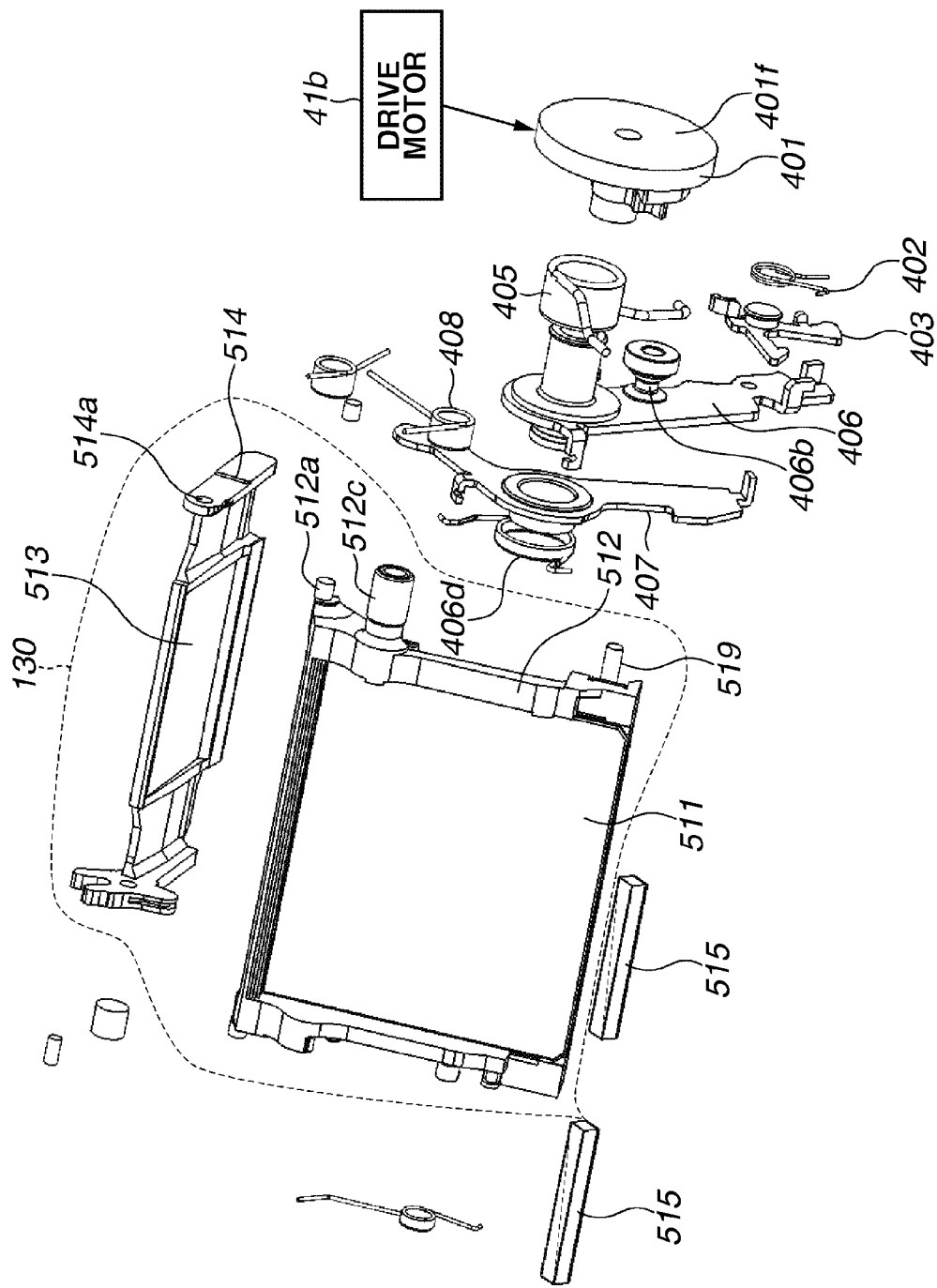
FIG. 2 is an exploded perspective view illustrating a configuration of a quick return mirror unit.
Figure 3B:
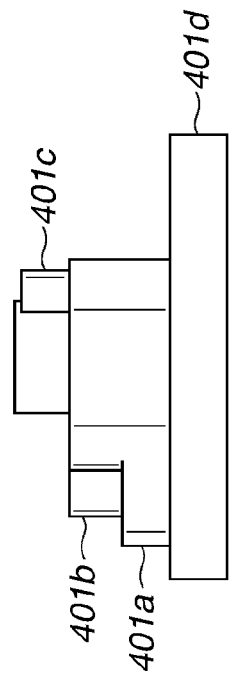
FIGS. 3A to 3C illustrate a drive lever unit and a cam gear.
Figure 3C:
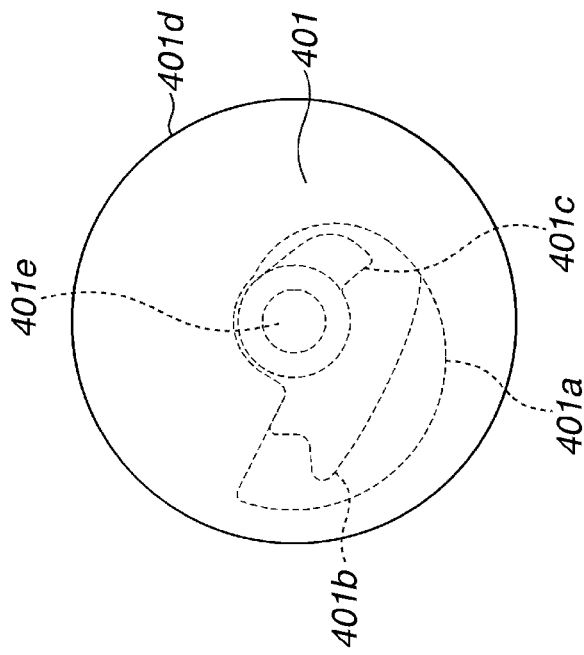
Figure 3A:
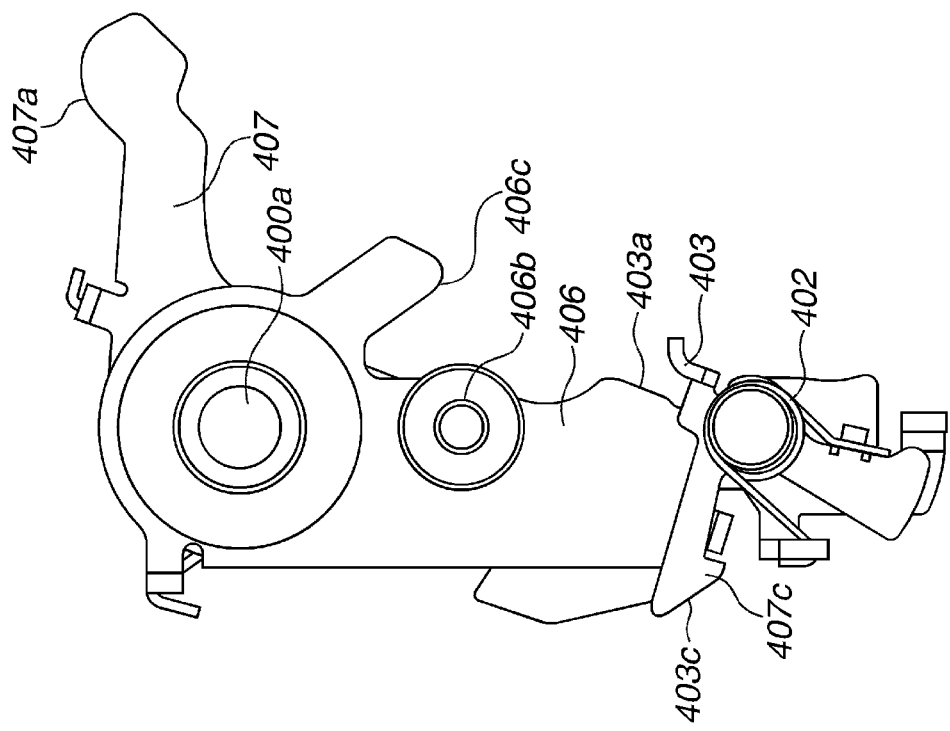

The mirror control unit 41 includes the mirror drive mechanism illustrated in FIG. 2. FIGS. 3A through 3C illustrate details of a mirror drive lever and cams. FIG. 2 is an exploded perspective view of a quick return mirror unit. FIG. 3A is a side view of a drive lever unit. FIGS. 3B and 3C are detail views of a cam gear 401. FIG. 3B illustrates the cam gear 401 when viewed from a direction perpendicular to a rotating shaft thereof. FIG. 3C illustrates the cam gear 401 when viewed from a direction along the rotating shaft. In the present exemplary embodiment, the cam gear 401 functions as a drive member or a cam member.

The mirror 130 includes a main mirror 511 and a sub mirror 513. The sub mirror 513 is a movable member for guiding the light from the lens 310 to the focus state detecting unit 42, and is fixed to a sub mirror holding member 514. The sub mirror holding member 514 is pivotably supported centering on a shaft (not illustrated) and a hole 514a provided on a main mirror holding member 512. When the main mirror holding member 512 is stopped at the mirror-up position, a part of light from the object reaches the focus state detecting unit 42.

When the main mirror holding member 512 is driven to the mirror-down position, the sub mirror holding member 514 is driven to an imaging retracting position together with the main mirror holding member 512. In the following descriptions, driving of the mirror 130 means an operation to rotate the mirror 130 centering on a shaft 512a of the main mirror holding member 512, and accordingly the sub mirror holding member 514 is driven.

A driving force of a drive motor 41b is transmitted to the cam gear 401. When the cam gear 401 rotates, a mirror charge lever 406 and a mirror drive lever 407 rotate in a counterclockwise or clockwise direction (in FIG. 3A) centering on a shaft provided on an outer surface of a mirror box (not illustrated). Thus, the mirror 130 can perform a mirror-up operation to move from the mirror-down position to the mirror-up position and a mirror-down operation to move from the mirror-up position to the mirror-down position. Referring to FIG. 3A, the mirror-up operation of the mirror 130 is performed toward the clockwise direction.

The mirror charge lever 406 is urged in the counterclockwise direction by an urging force of a mirror-up spring 405. The main mirror holding member 512, serving as a mirror backup plate, is urged at a shaft 512c in the direction of the mirror-down operation (the counterclockwise direction in FIG. 3A) by an urging force of a mirror-down spring 408. The mirror drive lever 407 is urged in the clockwise direction by an urging force of a mirror drive lever spring 406d.

Although an outer circumferential surface of the cam gear 401 is provided with a gear unit 401d (see FIG. 3B) formed thereon, gear teeth are not illustrated. A circular side surface 401f of the cam gear 401 (see FIG. 2) is provided with a conductive pattern formed thereon to detect its rotational position. A conductive contact element contacts the conductive pattern according to the rotational position of the cam gear 401. The system control unit 50 receives an input of a mirror-up operation completion signal from the conductive contact element. Thus, the control unit 50b can determine the rotational position of the cam gear 401, and accordingly determine whether the mirror 130 is set at the mirror-up position. Thus, the conductive pattern formed on the circular side surface 401f of the cam gear 401 enables the control unit 50b to detect whether the mirror 130 is disposed at the mirror-up position. If the operation of the mirror drive mechanism including the cam gear 401 fails because of a certain reason, even the drive motor 41b is turned ON for a predetermined time duration, the mirror-up operation completion signal is not input to the control unit 50b. In this case, the control unit 50b determines as an abnormal condition and stops driving the drive motor 41b.

The control unit 50b has two different driving methods regarding the mirror-up operation. A first driving method is a spring-up method. Hereinafter, a mirror operation mode based on the spring-up method will be referred to as a high-speed mode. A second driving method is a motor-up method. Hereinafter, a mirror operation mode based on the motor-up method will be referred to as a silent mode.

The spring-up method drives the mirror 130 at a high speed by releasing at a burst the spring force of the charged mirror-up spring 405. Accordingly, the performance of the continuous shooting frame speed and the release time lag can be enhanced. In FIGS. 4A to 4C, illustrations of the gear unit 401d and a first cam portion 401a of the cam gear 401 will be omitted as required for simplification.

FIG. 4A illustrates a standby state in which the mirror-down operation is completed. FIG. 4B illustrates a state in which the cam gear 401 has rotated in the counterclockwise direction and stopped in the early stage of the mirror-up operation. FIG. 4C illustrates a state in which the mirror-up operation is completed.

The cam gear 401 is provided with the first cam portion 401a, a fastening release cam 401b, and a second cam portion 401c formed thereon. In the present exemplary embodiment, the first cam portion 401a functions as a first engaging portion, and the second cam portion 401c functions as a second engaging portion. These cam portions 401a and 401c are formed in different ranges in a circumferential direction centering on the rotating shaft of the cam gear 401, as illustrated in FIG. 3C. A phase angle range centering on the rotating shaft is set narrower to the second cam portion 401c than that of the first cam portion 401a and the fastening release cam 401b. A first cam follower portion 406b of the mirror charge lever 406 and the first cam portion 401a of the cam gear 401 have such a positional relation that they can contact each other in the direction perpendicular to the rotating shaft of the cam gear 401. A second cam follower portion 406c of the mirror charge lever 406 and the second cam portion 401c of the cam gear 401 have such a positional relation that they can contact each other in the direction perpendicular to the rotating shaft of the cam gear 401.

In the standby state illustrated in FIG. 4A, the mirror charge lever 406 is urged in the counterclockwise direction by the urging force of the mirror-up spring 405. However, the first cam follower portion 406b provided on the mirror charge lever 406 is in contact with the cam top (a portion having the maximum lift) of the first cam portion 401a of the cam gear 401. Thus, the drive of the mirror charge lever 406 in the counterclockwise direction is prevented, and accordingly the mirror-down state can be maintained.

The main mirror holding member 512 contacts a stopper 519 (see FIG. 2) formed on an inner surface of a mirror box (not illustrated), and thus is positioned at the mirror-down position. A shaft 512c is integrally formed on the main mirror holding member 512. A contact portion 407a of the mirror drive lever 407 is in contact with the shaft 512c from the lower side in FIG. 4A. The urging force of the mirror-down spring 408 in the mirror-down operation direction acts on the main mirror holding member 512 from the upper side in FIG. 4A centering on the shaft 512a. A mirror hook 403 is rotatably connected with a lower end of the mirror charge lever 406. A hook portion 403c of the mirror hook 403 is urged in the counterclockwise direction in FIG. 4A by the urging force of the mirror hook spring 402, and engaged with a latching portion 407c of the mirror drive lever 407.

The mirror-up operation performed when the determination unit 50a determines that the high-speed mode by the spring-up method is set will be described below with reference to FIGS. 4A to 4C. With the spring-up method, the first cam portion 401a is rotated by the driving force of the drive motor 41b, so that the charged spring force of the mirror-up spring 405 can be released at a burst. The urging force of the mirror-up spring 405 enables the mirror 130 to move to the mirror-up position at a high speed.

When the determination unit 50a determines that the high-speed mode is set, and when the shutter release button (not illustrated) is full-pressed and the second switch SW2 of the switch unit 62 turns ON, the control unit 50b outputs a drive signal for the high-speed mirror-up operation to the drive motor 41b. At this timing, the control unit 50b performs drive control to supply the full power to the drive motor 41b with 100% duty ratio. Thus, the drive motor 41b is driven at a high speed in a first direction, and accordingly the cam gear 401 rotates in the counterclockwise direction at a high speed. Then, the cam gear 401 changes to the state illustrated in FIG. 4B and then reaches a phase (rotational angle) equivalent to the mirror-up position illustrated in FIG. 4C. At this timing, upon detection of the conductive pattern provided on the circular side surface 401f of the cam gear 401, the control unit 50b inputs the mirror-up operation completion signal. Thus, the drive motor 41b stops.

In the standby state in FIG. 4A, the mirror charge lever 406 is urged in the counterclockwise direction by the mirror-up spring 405. At this timing, the cam top of the first cam portion 401a of the cam gear 401 is in contact with the first cam follower portion 406b provided on the mirror charge lever 406. Thus, the mirror charge lever 406 remains in the standby state in FIG. 4A against the urging force of the mirror-up spring 405. When the drive motor 41b is driven in the first direction, the cam gear 401 in the standby state in FIG. 4A rotates in the counterclockwise direction at a high speed. When the cam gear 401 rotates in the counterclockwise direction, the first cam follower portion 406b provided on the mirror charge lever 406 drops to the cam bottom of the first cam portion 401a of the cam gear 401.

Thus, the spring force of the charged mirror-up spring 405 is released at a burst. Accordingly, the mirror charge lever 406 is driven in the counterclockwise direction by the urging force of the mirror-up spring 405, as illustrated in FIG. 4C. At this timing, the mirror drive lever 407 connected with the mirror charge lever 406 via the mirror hook 403 is also driven in the counterclockwise direction at a high speed. Then, the contact portion 407a of the drive lever 407 raises the shaft 512c of the main mirror holding member 512 at a high speed, and the mirror 130 is driven toward the mirror-up position at a high speed. Along with the mirror-up operation of the main mirror holding member 512, the sub mirror holding member 514 connected thereto via the hole 514a is also driven to the mirror-up position at a high speed.

In the standby state in FIG. 4A, the contact between the first follower portion 406b provided on the mirror charge lever 406 and the cam top of the first cam portion 401a of the cam gear 401 is released by the driving force of the drive motor 41b. After the contact between the first follower portion 406b provided on the mirror charge lever 406 and the cam top of the first cam portion 401a of the cam gear 401 is released, the mirror-up operation of the mirror 130 in the high-speed mode is started. The driving force of the drive motor 41b does not serve as a direct driving force for driving the mirror 130 to the mirror-up position. Only the urging force of the mirror-up spring 405 serves as the direct driving force for driving the mirror 130 to the mirror-up position. Therefore, in the mirror-up operation of the mirror 130 in the high-speed mode, the mirror 130 is driven to the mirror-up position without being connected with the drive motor 41b.

A detailed operation order of the mirror-up operation in the high-speed mode is as follow. After the cam gear 401 stops at a phase illustrated in FIG. 4C, the main mirror holding member 512 i.e., the mirror 130, reaches the mirror-up position. In the high-speed mode, the mirror 130 flips up by the urging force of the mirror-up spring 405. When the main mirror holding member 512 reaches the mirror-up position, it abuts on a stopper 515 formed on the inner surface of the mirror box (not illustrated) from below, and is positioned at the mirror-up position. In this case, since the main mirror holding member 512 abuts on the stopper 515 at a high speed, an impulsive sound is generated at the moment of abutting.

As described above, the mirror operations when the determination unit 50a determines that the high-speed mode is set are made. During the transition to the mirror-up operation, the second cam follower portion 406c of the mirror charge lever 406 does not contact the second cam portion 401c of the cam gear 401.

In the mirror-down operation, the cam gear 401 further rotates in the counterclockwise direction in FIG. 4 to rotate the mirror hook 403 during which a contact surface 403a of the mirror hook 403 is in contact with the fastening release cam 401b. Rotation of the mirror drive lever 407 in the mirror-down direction by the urging force of the mirror drive lever spring 406d causes the mirror 130 to perform the mirror-down operation.

The mirror-up operation when the determination unit 50a determines that the silent mode by the motor-up method is set will be described below with reference to FIGS. 5A to 5D. In the motor-up method, the spring force of the mirror-up spring 405 is gradually released by using the driving force of the drive motor 41b. Thus, the mirror 130 is driven to the mirror-up position at a low speed and impulsive sound generation can be prevented at the time of the mirror-up operation.

Figure 5A:
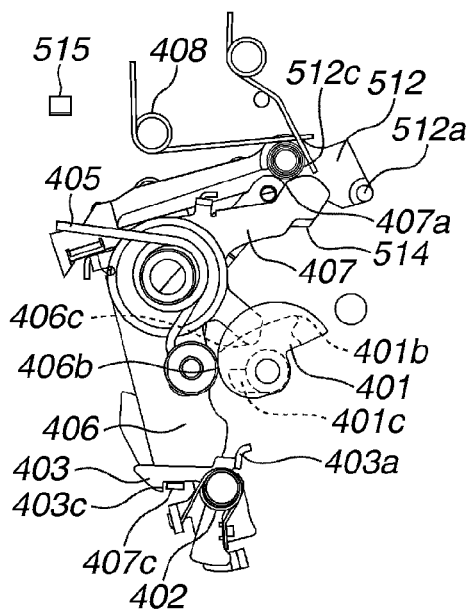
FIGS. 5A to 5D illustrate a mirror-up operation of the quick return mirror unit in a silent mode.
Figure 5B:
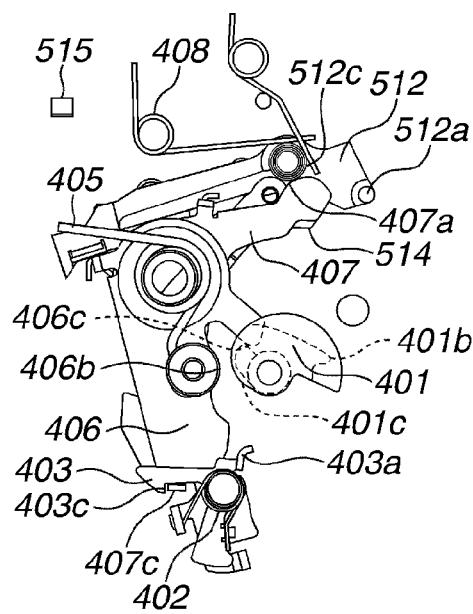
Figure 5C:
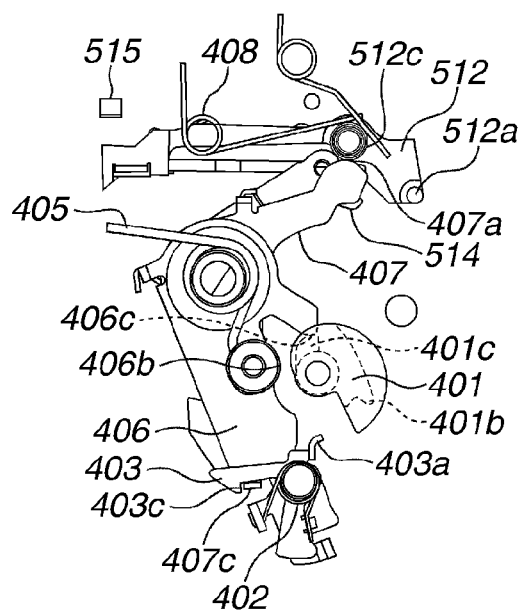
Figure 5D:
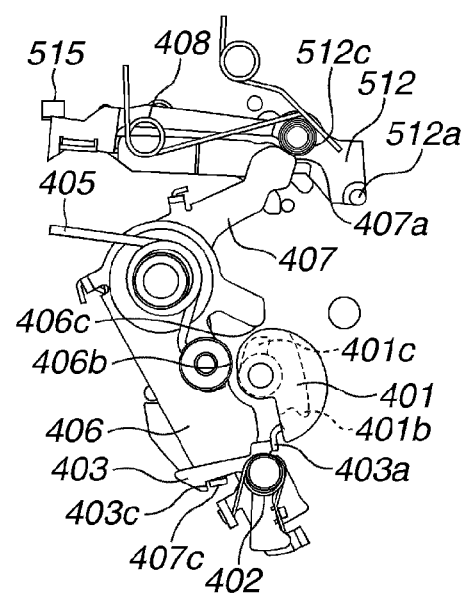

FIG. 5A illustrates a state in which the drive of the mirror 130 has stopped in the mirror-up operation. FIG. 5B illustrates a state in which the cam gear 401 has rotated in the clockwise direction while the mirror-up operation stopped in FIG. 5A. FIG. 5C illustrates a state at a moment when the second cam portion 401c of the cam gear 401 separates from the second cam follower portion 406c of the mirror charge lever 406. FIG. 5D illustrates a state in which the mirror-up operation is completed.

When the shutter release button (not illustrated) is full-pressed and the second switch SW2 of the switch unit 62 turns ON, the control unit 50b outputs a drive signal for the low-speed mirror-up operation to the drive motor 41b. The drive motor 41b is driven at a low speed in the second direction which is opposite to the above-described first direction. At this timing, the control unit 50b performs drive control based on a pulse width modulation (PWM) signal (for example, with 50% duty ratio).

Thus, the drive motor 41b is driven in the second direction at a lower speed than the speed in the high-speed mode. More specifically, the drive motor 41b is driven in the second direction by using a different power supply method from that used in the high-speed mode. In the mirror-up operation, the driving direction of the drive motor 41b is opposite to that in the high-speed mode, and accordingly the cam gear 401 rotates in the clockwise direction at a low speed in FIG. 5.

The state of the drive mechanism in the standby state is similar to the state described in the high-speed mode (see FIG. 4A), and detailed descriptions will be omitted.

When the cam gear 401 starts low-speed rotation in the clockwise direction from the standby state in FIG. 4A, the mirror charge lever 406 urged by the mirror-up spring 405 starts moving in the mirror-up operation direction. Accordingly, the mirror drive lever 407 and the mirror hook 403 start moving, and the mirror 130 also starts moving. The drive mechanism is described in the high-speed mode, and detailed descriptions will be omitted.

FIG. 5A illustrates a state in which the main mirror holding member 512 is in the middle of the mirror-up operation using the urging force of the mirror-up spring 405. During the transition from the standby state in FIG. 4A to the state illustrated in FIG. 5A, the first cam follower portion 406b of the mirror charge lever 406 traces the first cam portion 401a of the cam gear 401. In a state in which the first cam portion 401a of the cam gear 401 contact the first cam follower portion 406b of the mirror charge lever 406, the mirror charge lever 406 rotates in the counterclockwise direction, and the main mirror holding member 512 performs the mirror-up operation.

In the silent mode, to reduce the impulsive sound at the time of the mirror-up operation, the first cam follower portion 406b of the mirror charge lever 406 traces the first cam portion 401a of the cam gear 401 to decrease the rotational speed of the mirror charge lever 406 by the urging force of the mirror-up spring 405. More specifically, when the first cam follower portion 406b of the mirror charge lever 406 traces the first cam portion 401a of the cam gear 401, the spring force of the charged mirror-up spring 405 is gradually released, and the mirror charge lever 406 rotates slowly.

At this timing, the mirror-down spring 408 presses down the shaft 512c of the main mirror holding member 512. Since the shaft 512c of the main mirror holding member 512 is in contact with the contact portion 407a of the drive lever 407, the urging force of the mirror-down spring 408 for pressing down the shaft 512c of the main mirror holding member 512 rotates the mirror charge lever 406 in the clockwise direction. Thus, the force for rotating the mirror charge lever 406 in the counterclockwise direction and the force for rotating the mirror charge lever 406 in the clockwise direction are balanced, and the operation of the main mirror holding member 512 stops in the state illustrated in FIG. 5A. According to the present exemplary embodiment, the mirror-down spring 408 functions as a first urging member, and the mirror-up spring 405 functions as a second urging member.

FIG. 5B illustrates a state in which the cam gear 401 has further rotated in the clockwise direction from the state in which the mirror-up operation stopped in FIG. 5A. In this state, the second cam portion 401c of the cam gear 401 contacts the second cam follower portion 406c of the mirror charge lever 406, and accordingly the mirror charge lever 406 rotates in the counterclockwise direction in FIG. 5B. Accordingly, the mirror charge lever 406 escapes from the state illustrated in FIG. 5A. The urging force of the mirror-up spring 405 rotates the mirror charge lever 406 in the counterclockwise direction, and accordingly the main mirror holding member 512 continues the mirror-up operation. As illustrated in FIG. 5B, the contact between the first cam follower portion 406b of the mirror charge lever 406 and the first cam portion 401a of the cam gear 401 is released.

FIG. 5C illustrates a state at a moment when the contact between the second cam follower portion 406c of the mirror charge lever 406 and the second cam portion 401c of the cam gear 401 is released. Then, in the state illustrated in FIG. 5D, the mirror-up operation completion signal is input to the control unit 50b. When the control unit 50b receives the input of the mirror-up operation completion signal, the control unit 50b stops the drive motor 41b. Thus, the mirror-up operation in the silent mode is completed. When the main mirror holding member 512 reaches the mirror-up position, it abuts on the stopper 515 from the lower side and is regulated and positioned. Since the main mirror holding member 512 abuts on the stopper 515 at a low speed, an impulsive sound generated at the moment of abutting is smaller than that generated in the high-speed mode.

During the transition from the state illustrated in FIG. 5C to the state illustrated in FIG. 5D, the mirror charge lever 406 does not contact the cam gear 401, and the mirror charge lever 406 rotates in the counterclockwise direction by the urging force of the mirror-up spring 405. More specifically, during the transition from the state illustrated in FIG. 5C to the state illustrated in FIG. 5D, the contact between the first cam follower portion 406b and the first cam portion 401a is released, and accordingly the contact between the second cam follower portion 406c and the second cam portion 401c of the cam gear 401 is also released.

Figure 7:
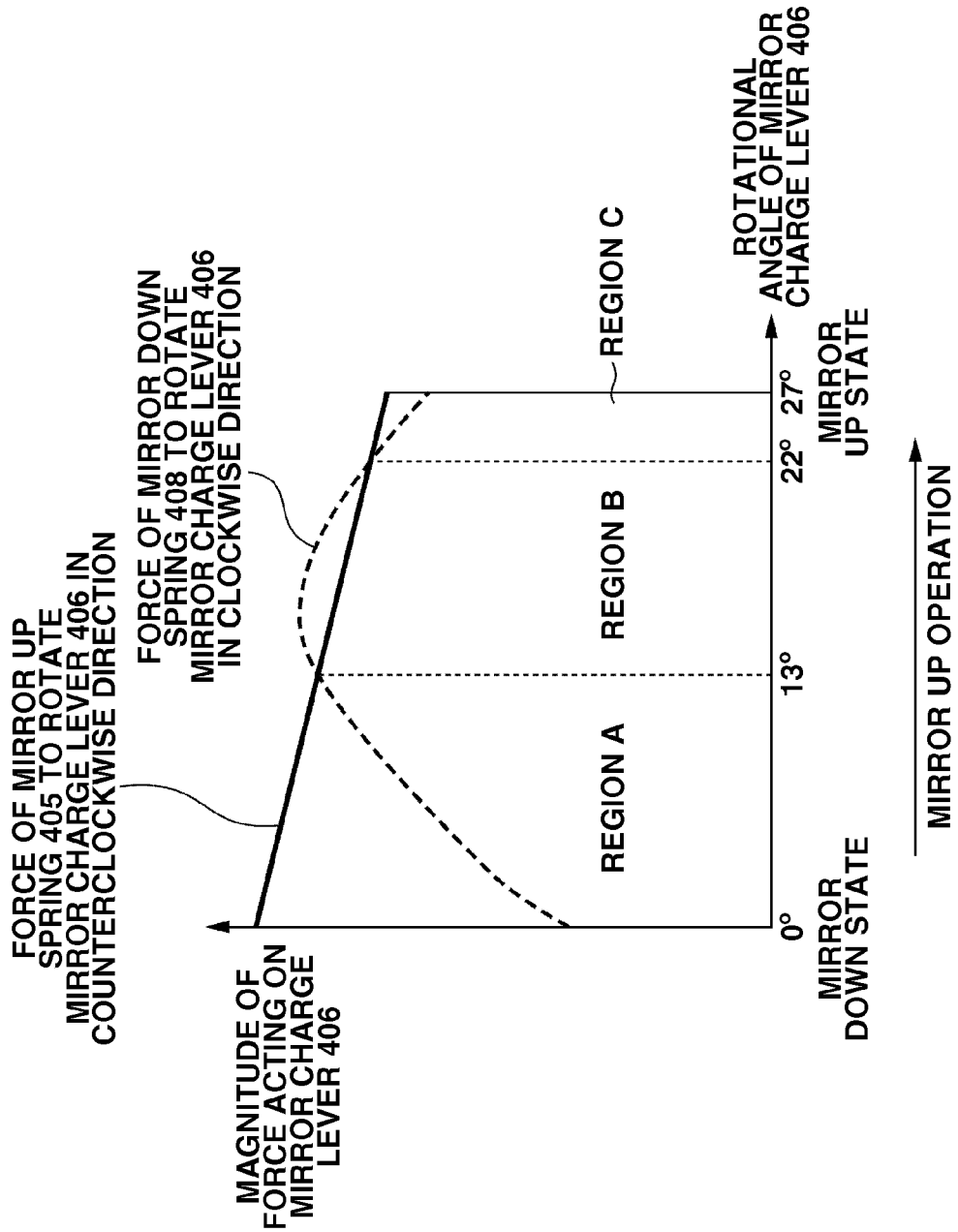
FIG. 7 illustrates a relation between an urging force of a mirror-up spring and an urging force of a mirror-down spring in a mirror-up operation.

FIG. 7 illustrates a relation between the urging force of the mirror-up spring 405 and the urging force of the mirror-down spring 408 when the main mirror holding member 512 performs the mirror-up operation. Referring to FIG. 7, the horizontal axis is assigned the rotational angle of the mirror charge lever 406 in the counterclockwise direction. The rotational angle of the mirror charge lever 406 in the standby state in FIG. 4A is set to 0 degree. In the states in which the main mirror holding member 512 reaches the mirror-up position in FIGS. 4C and 5D, the rotational angle of the mirror charge lever 406 is 27 degrees. Referring to FIG. 7, the vertical axis indicates the magnitude of the force for rotating the mirror charge lever 406 in the counterclockwise direction among the urging force of the mirror-up spring 405, and the magnitude of the force for rotating the mirror charge lever 406 in the clockwise direction among the urging force of the mirror-down spring 408.

In a state in which the rotational angle of the mirror charge lever 406 is 0 degree, the force for rotating the mirror charge lever 406 in the counterclockwise direction exceeds the force for rotating the mirror charge lever 406 in the clockwise direction. Therefore, the mirror charge lever 406 rotates in the counterclockwise direction by the urging force of the mirror-up spring 405. This state is equivalent to the standby state in FIG. 4A.

In a state in which the rotational angle of the mirror charge lever 406 is 13 degrees, the force for rotating the mirror charge lever 406 in the counterclockwise direction equals the force for rotating the mirror charge lever 406 in the clockwise direction. This state is equivalent to the state illustrated in FIG. 5A.

In a state in which the rotational angle of the mirror charge lever 406 is 22 degrees, the force for rotating the mirror charge lever 406 in the counterclockwise direction exceeds again the force for rotating the mirror charge lever 406 in the clockwise direction. Therefore, the mirror charge lever 406 rotates in the counterclockwise direction by the urging force of the mirror-up spring 405.

As illustrated in FIG. 7, in regions A and C, the force of the mirror-up spring 405 for rotating the mirror charge lever 406 in the counterclockwise direction is larger than the force of the mirror-down spring 408 for rotating the mirror charge lever 406 in the clockwise direction. In a region B, the force of the mirror-down spring 408 for rotating the mirror charge lever 406 in the clockwise direction is equal to or larger than the force of the mirror-up spring 405 for rotating the mirror charge lever 406 in the counterclockwise direction.

When the mirror-up operation is performed in the high-speed mode, the mirror charge lever 406 rotates in the counterclockwise direction at a high speed, a large inertia force for rotating the mirror charge lever 406 in the counterclockwise direction is produced. Therefore, even in a state in which the rotational angle of the mirror charge lever 406 is 13 degrees, the inertia force enables passing through the region B in FIG. 7. However, when the mirror-up operation is performed in the low-speed mode, the inertia force for rotating the mirror charge lever 406 in the counterclockwise direction is very small, and therefore the mirror charge lever 406 will stop in the state illustrated in FIG. 5A. In addition, if the above-described second cam follower portion 406c of the mirror charge lever 406 and the second cam portion 401c of the cam gear 401 are not formed, the mirror charge lever 406 will rotate in the clockwise direction in the region B in FIG. 7.

In the region A, the first cam follower portion 406b of the mirror charge lever 406 traces the first cam portion 401a of the cam gear 401. In the region B, the second cam follower portion 406c of the mirror charge lever 406 traces the second cam portion 401c of the cam gear 401. In the region C, the mirror charge lever 406 rotates in the counterclockwise direction by the urging force of the mirror-up spring 405 without contacting the cam gear 401.

An example of the operation performed by the determination unit 50a will be described below with reference to a flowchart in FIG. 6.

Figure 6:
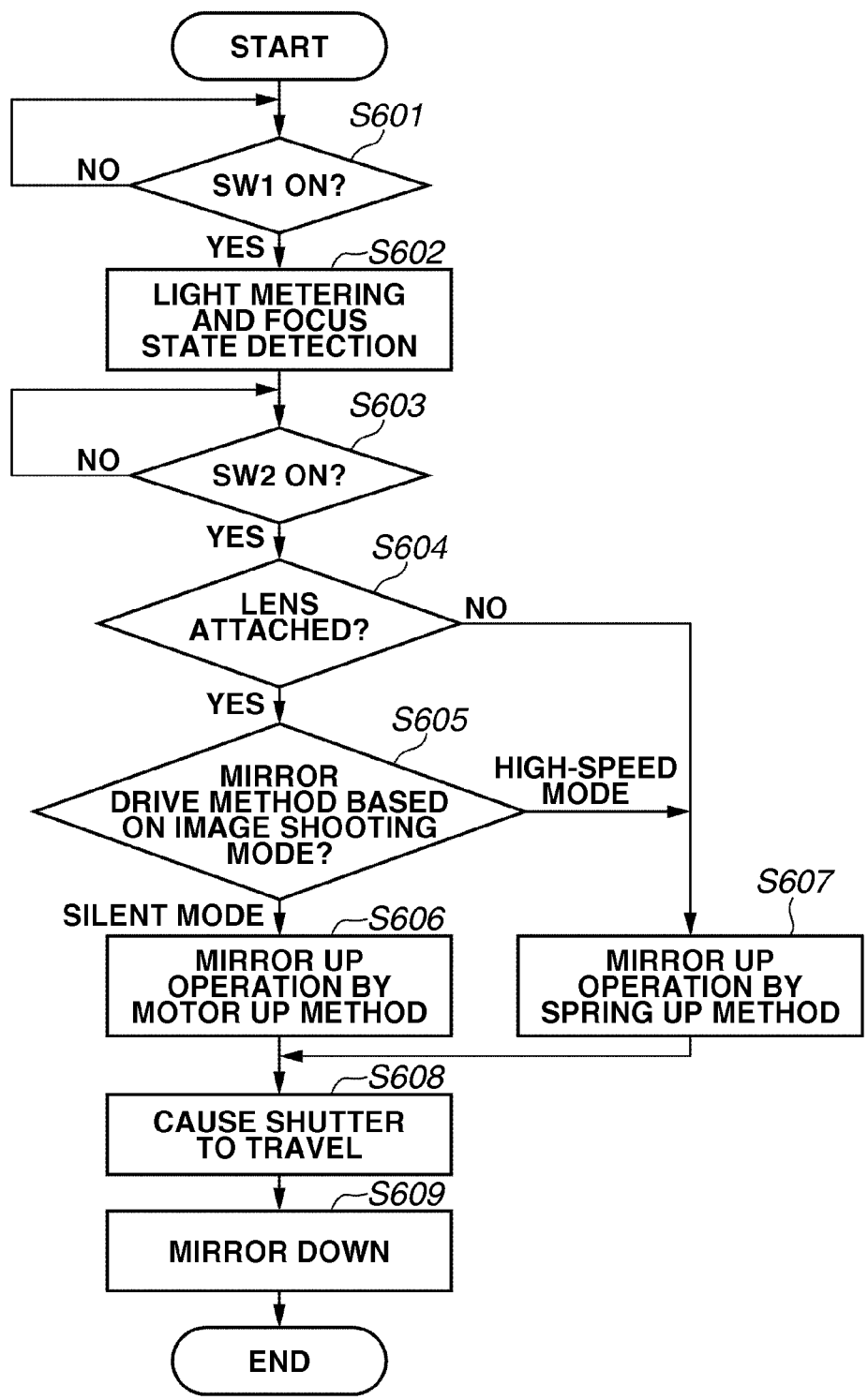
FIG. 6 is a flowchart illustrating operations since the imaging apparatus receives an imaging instruction until it completes imaging.

FIG. 6 is a flowchart illustrating operations performed since the imaging apparatus receives an imaging instruction until it completes imaging.

In step S601, the system control unit 50 determines whether the first switch SW1 is ON. If the first switch SW1 is not ON (NO in step S601), the system control unit 50 repeats detecting the state of the first switch SW1. If the first switch SW1 is ON (YES in step S601), the processing proceeds to step S602.

In step S602, in response to an instruction from the system control unit 50, the focus state detecting unit 42 performs the focus state detection processing, and the light metering unit 46 performs the light metering processing. When the system control unit 50 acquires the results of respective processing, the processing proceeds to step S603.

In step S603, the system control unit 50 determines whether the second switch SW2 is ON. When the second switch SW2 is not ON (NO in step S603), the system control unit 50 repeats detecting the state of the second switch SW2. If the system control unit 50 determines that the second switch SW2 is ON (YES in step S603), the processing proceeds to step S604.

In step S605, the determination unit 50a determines the mirror drive method to be used by the control unit 50b based on the information about the image capturing mode set by the operation unit 70. An example of a relation between the image capturing mode and the mirror drive method is illustrated in Table 1.

TABLE 1

| Image capturing mode | Mirror drive method |
| --- | --- |
| Single image capturing mode | Motor-up method |
| Low-speed continuous image capturing mode | |
| Live view mode | |

TABLE 1-continued

| High-speed continuous image capturing mode | Spring-up method |
| --- | --- |

In the present exemplary embodiment, the single image capturing mode, two different continuous image capturing modes, and the live view mode are provided. When the single image capturing mode or the low-speed continuous image capturing mode is set (SILENT MODE in step S605), the processing proceeds to step S606. In step S606, the system control unit 50 selects the silent mode based on the motor-up method with small operation sound. When the high-speed continuous image capturing mode is set (HIGH-SPEED MODE in step S605), the processing proceeds to step S607. In step S607, the system control unit 50 selects the high-speed mode based on the spring-up method enabling the high-speed operation but with a large operation sound.

The mirror-up operation is required not only during imaging but also at other timings. For example, the mirror-up operation is performed during transition to a live view mode in which the mirror 130 is driven to the mirror-up position and the shutter 12 is released to the open state to display on the image display unit 28 a real-time image currently being captured by the image processing unit 20. As the driving method in the live view mode, the system control unit 50 selects the silent mode based on the motor-up method with a small operation sound, as illustrated in the above-described Table 1.

In the present exemplary embodiment, as an example of the mirror drive method with respect to the image capturing mode, the mirror drive methods corresponding to drive modes such as the single image capturing mode, the low-speed continuous image capturing mode, and the high-speed continuous image capturing mode are selected. However, the processing is not limited these examples. For example, the imaging apparatus can be configured to select a silent image capturing mode and a regular image capturing mode as the image capturing mode by the operation unit 70, and these image capturing modes may be associated with the mirror drive method.

In step S606, the control unit 50b outputs a drive signal to the drive motor 41b based on the motor-up method, and drives the drive motor 41b at a low speed in the second direction opposite to the direction in the case of the spring-up method. Accordingly, the mirror-up operation can be performed so as not to generate a large collision sound. When the mirror-up operation is completed, the processing proceeds to step S608.

On the other hand, in step S607, the control unit 50b outputs a drive signal to the mirror drive motor 41b based on the spring-up method, and drives the drive motor 41b at a high speed in the first direction opposite to the direction in the case of the motor-up method. Thus, the contact between the first cam follower portion 406b and the cam top of the first cam portion 401a of the cam gear 401 is released, and the mirror-up operation can be performed at a high speed by the urging force of the mirror-up spring 405.

When the mirror-up operation is completed, the processing proceeds to step S608. In step S608, the shutter control unit 40 causes the shutter 12 to start traveling. Based on an exposure control value according to the result of light metering in step S602, the system control unit 50 performs predetermined timing control. When the shutter 12 completes traveling, the processing proceeds to step S609. In step S609, the control unit 50b outputs a drive signal for the mirror-down operation to the drive motor 41b. When the mirror-down operation is completed, the above-described processing sequence is completed.

The present invention can also be achieved with the following processing. Software (a program) for achieving the functions of the above-described exemplary embodiment is supplied to a system or an apparatus via a network or various storage media, and a computer (or a CPU or a micro processing unit (MPU)) of the system or the apparatus loads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-166965 filed Jul. 29, 2011, which is hereby incorporated by reference herein in its entirety.

What is claimed is:

1. An imaging apparatus comprising:
a mirror member which is movable between a first position disposed on an optical axis of an imaging optical system and a second position retracted from the optical axis;
a first urging member configured to urge the mirror member toward the first position;
a second urging member configured to urge the mirror member toward the second position; and
a drive member configured to be driven by a driving source to drive the mirror member to the second position,
wherein a first engaging portion and a second engaging portion to be engaged with the mirror member are formed on the drive member,
wherein, in a case where the mirror member is driven to the second position, the mirror member is engaged with the first engaging portion and driven to the second position in a region in which a force of the second urging member for urging the mirror member toward the second position is larger than a force of the first urging member for urging the mirror member toward the first position, and
wherein the mirror member is engaged with the second engaging portion and driven to the second position in a region in which the force of the first urging member for urging the mirror member toward the first position is equal to or larger than the force of the second urging member for urging the mirror member toward the second position.

2. The imaging apparatus according to claim 1,
wherein, in a case where the mirror member is disposed in the first position, the mirror member is in an engagement state to engage with the first engaging portion of the drive member,
wherein, in a case where the driving source rotates the drive member from the engagement state to a first direction, the engagement state between the mirror member and the first engaging portion is released, and the mirror member is driven to the second position without being engaged with the first engaging portion and the second engaging portion, and
wherein, in a case where the driving source rotates the drive member from the engagement state to a second direction opposite to the first direction, the mirror member is engaged with the first engaging portion or the second engaging portion and driven to the second position.

3. The imaging apparatus according to claim 1,
wherein the drive member is a cam member configured to be driven by a motor serving as the driving source,
wherein a first cam portion as the first engaging portion and a second cam portion as the second engaging portion are formed on the cam member,
wherein, in a case where the mirror member is driven to the second position, the mirror member traces the first cam portion and is driven to the second position in the region in which the force of the second urging member for urging the mirror member toward the second position is larger than the force of the first urging member for urging the mirror member toward the first position, and
wherein the mirror member traces the second cam portion and is driven to the second position in the region in which the force of the first urging member for urging the mirror member toward the first position is equal to or larger than the force of the second urging member for urging the mirror member toward the second position.

4. The imaging apparatus according to claim 3,
wherein, in a case where the mirror member is disposed in the first position, the mirror member is in a contact state to contact with the first cam portion of the cam member,
wherein, in a case where the motor drives the cam member from the contact state to a first direction, the contact state between the mirror member and the first cam portion is released, and the mirror member is driven to the second position without tracing the first cam portion and the second cam portions, and
wherein, in a case where the motor drives the cam member from the contact state to a second direction opposite to the first direction, the mirror member traces the first cam portion or the second cam portion and is driven to the second position.

5. The imaging apparatus according to claim 4,
wherein a first cam follower portion for tracing the first cam portion and a second cam follower portion for tracing the second cam portion are formed on the mirror member,
wherein, in a case where the motor drives the cam member from the contact state to the second direction to drive the mirror member to the second position, the second cam follower portion does not contact the second cam portion in a case where the first cam follower portion traces the first cam portion, and
wherein, in a case where the motor drives the cam member from the contact state to the second direction to drive the mirror member to the second position, the first cam follower portion does not contact the first cam portion in a case where the second cam follower portion traces the second cam portion.

* * * * *